(12) United States Patent
Saito et al.

(10) Patent No.: US 11,637,941 B2
(45) Date of Patent: Apr. 25, 2023

(54) IMAGE FORMING APPARATUS, IMAGE FORMING METHOD, AND NON-TRANSITORY COMPUTER READABLE MEDIUM THAT REDUCE WORKLOAD FOR ADJUSTMENTS RELATED TO TRANSPORT OF PAPER

(71) Applicant: FUJIFILM Business Innovation Corp., Tokyo (JP)

(72) Inventors: Takayuki Saito, Kanagawa (JP); Hiroyuki Tojo, Kanagawa (JP); Makoto Ito, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/697,934

(22) Filed: Mar. 18, 2022

(65) Prior Publication Data
US 2023/0078843 A1    Mar. 16, 2023

(30) Foreign Application Priority Data

Sep. 14, 2021  (JP) .............................. JP2021-149631

(51) Int. Cl.
*H04N 1/00*    (2006.01)
*H04N 1/23*    (2006.01)
(Continued)

(52) U.S. Cl.
CPC ....... *H04N 1/00588* (2013.01); *H04N 1/0009* (2013.01); *H04N 1/00015* (2013.01); *H04N 1/00045* (2013.01); *H04N 1/0066* (2013.01); *H04N 1/00076* (2013.01); *H04N 1/00082* (2013.01); *H04N 1/00628* (2013.01); *H04N 1/00663* (2013.01); *H04N 1/00724* (2013.01); *H04N 1/00766* (2013.01); *H04N 1/00779* (2013.01); *H04N 1/2323* (2013.01);
(Continued)

(58) Field of Classification Search
None
See application file for complete search history.

(56) References Cited

U.S. PATENT DOCUMENTS 7,770,878 B2 *   8/2010  Hosoi ...................... B65H 3/44
                                                            271/97
8,074,978 B2 *  12/2011  Takahashi ................ B65H 3/48
                                                            271/97
(Continued)

FOREIGN PATENT DOCUMENTS

JP    2010241568    10/2010
JP    2011140359     7/2011
JP    2020070166     5/2020

*Primary Examiner* — Scott A Rogers
(74) *Attorney, Agent, or Firm* — JCIPRNET

(57) ABSTRACT

An image forming apparatus includes a processor configured to: receive paper information on a type of paper on which an image is formed; acquire assist information about assistance to supply the paper by supplying gas to the paper and adjustment information about positioning of the paper after assistance to supply the paper is performed, the assist information and the adjustment information corresponding to the received paper information and relating to transport of the paper; and perform control for storing the paper information, the assist information, and the adjustment information in association with one another into a memory.

20 Claims, 10 Drawing Sheets

90

| AIR-ASSIST ADJUSTMENT VALUE / PAPER INFORMATION | FIRST ADJUSTMENT VALUE | | | | SECOND ADJUSTMENT VALUE | | | | ... |
|---|---|---|---|---|---|---|---|---|---|
| | FIRST FAN | SECOND FAN | ... | nth FAN | FIRST FAN | SECOND FAN | ... | nth FAN | |
| | LOW | OFF | ... | 1 TO 13 | LOW | LOW | ... | 1 TO 13 | |
| A4, 80 gsm, PLAIN, UNCOAT | ALIGNMENT ADJUSTMENT VALUE (AL1-1) | | | | ALIGNMENT ADJUSTMENT VALUE (AL1-2) | | | | ... |
| A4, 100 gsm, PLAIN, UNCOAT | ALIGNMENT ADJUSTMENT VALUE (AL2-1) | | | | ALIGNMENT ADJUSTMENT VALUE (AL2-2) | | | | ... |
| ... | ... | | | | ... | | | | ... |

(51) Int. Cl.
 *B65H 7/16* (2006.01)
 *B65H 3/48* (2006.01)
(52) U.S. Cl.
 CPC ............ *H04N 1/2338* (2013.01); *B65H 3/48* (2013.01); *B65H 7/16* (2013.01)

(56) References Cited

U.S. PATENT DOCUMENTS

| | | | | |
|---|---|---|---|---|
| 8,210,519 | B2* | 7/2012 | Fukusaka | B65H 3/48 271/104 |
| 8,272,634 | B2* | 9/2012 | Fukatsu | B65H 3/128 271/97 |
| 8,366,101 | B2* | 2/2013 | Morita | B65H 3/48 271/226 |
| 8,444,138 | B2 | 5/2013 | Taki | |
| 10,353,315 | B2* | 7/2019 | Imai | G03G 15/502 |
| 10,507,994 | B2* | 12/2019 | Sendo | B65H 5/222 |
| 10,530,950 | B2* | 1/2020 | Watanabe | B65H 5/062 |
| 10,703,595 | B2* | 7/2020 | Nishikawa | B65H 3/08 |
| 10,829,326 | B2* | 11/2020 | Matsui | B65H 3/48 |
| 11,130,646 | B2* | 9/2021 | Nishikawa | B65H 7/06 |
| 11,358,818 | B2* | 6/2022 | Yamaguchi | B65H 7/02 |
| 2017/0174458 | A1* | 6/2017 | Takano | G03G 15/6532 |
| 2019/0171150 | A1* | 6/2019 | Arai | G03G 15/5016 |
| 2020/0140215 | A1 | 5/2020 | Ogasawara | |

* cited by examiner

FIG. 4

| AIR-ASSIST ADJUSTMENT VALUE / PAPER INFORMATION | FIRST ADJUSTMENT VALUE | | | | SECOND ADJUSTMENT VALUE | | | | ... |
|---|---|---|---|---|---|---|---|---|---|
| | FIRST FAN | SECOND FAN | ... | nth FAN | FIRST FAN | SECOND FAN | ... | nth FAN | |
| A4, 80 gsm, PLAIN, UNCOAT | LOW | OFF | ... | 1 TO 13 | LOW | LOW | ... | 1 TO 13 | ... |
| | ALIGNMENT ADJUSTMENT VALUE (AL1-1) | | | | ALIGNMENT ADJUSTMENT VALUE (AL1-2) | | | | |
| A4, 100 gsm, PLAIN, UNCOAT | ALIGNMENT ADJUSTMENT VALUE (AL2-1) | | | | ALIGNMENT ADJUSTMENT VALUE (AL2-2) | | | | |
| ... | ... | | | | ... | | | | |

| NO | PAPER INFORMATION | | | AIR-ASSIST ADJUSTMENT VALUE (AA) | | | ALIGNMENT ADJUSTMENT VALUE (AL) |
|---|---|---|---|---|---|---|---|
| | PAPER SIZE | WEIGHT | PAPER TYPE | COATING | FIRST FAN | SECOND FAN | ... | nth FAN | |
| 1 | A4 | 80 gsm | PLAIN | UNCOAT | LOW | OFF | ... | 1 TO 13 | ALIGNMENT ADJUSTMENT VALUE (AL1-1) |
| 2 | A4 | 80 gsm | PLAIN | UNCOAT | LOW | LOW | ... | 1 TO 13 | ALIGNMENT ADJUSTMENT VALUE (AL1-2) |
| ... | ... | ... | ... | ... | ... | ... | ... | ... | ... |

FIG. 10

|  | | SEARCH CONDITION | | | | |
|---|---|---|---|---|---|---|
|  | | 1 | 2 | 3 | 4 | 5 |
| PAPER INFORMATION | PAPER SIZE | A | B | B | B | B |
| | WEIGHT | A | A | B | B | B |
| | PAPER TYPE | A | A | A | A | C |
| | COATING | A | A | A | C | A |

IMAGE FORMING APPARATUS, IMAGE FORMING METHOD, AND NON-TRANSITORY COMPUTER READABLE MEDIUM THAT REDUCE WORKLOAD FOR ADJUSTMENTS RELATED TO TRANSPORT OF PAPER

CROSS-REFERENCE TO RELATED APPLICATIONS

This application is based on and claims priority under 35 USC 119 from Japanese Patent Application No. 2021-149631 filed Sep. 14, 2021.

BACKGROUND

(i) Technical Field

The present disclosure relates to an image forming apparatus, an image forming method, and a non-transitory computer readable medium.

(ii) Related Art

A technique for reducing the trouble in transport of paper at an air paper feeding device has been known (see, for example, Japanese Unexamined Patent Application Publication No. 2020-070166). This technique is applied to a paper feeding parameter management system in which an image forming apparatus including a paper feeding device that feeds paper by air-sending and attraction and a management apparatus are connected to each other through a communication network. The image forming apparatus transmits papery type information about the type of paper to be fed, an adjusted paper feeding parameter, and a transport result of paper feeding based on the paper feeding parameter to the management apparatus. The management apparatus collects adjustment results in which the paper type information, the paper feeding parameter, and the transport result are associated with one another, and sets a paper feeding parameter corresponding to the paper type information of the type of paper to be used, on the basis of the transport result, for the image forming apparatus to be processed.

A technique for preventing overlapping and slip during feeding of sheets (paper) has also been known (see, for example, Japanese Unexamined Patent Application Publication No. 2010-241568). For this technique, sheet feeding means for feeding sheets one by one, an air heater that generates warm air, a fan that sends the warm air to the sheet feeding means, a sheet-feeding-state detection sensor that detects a feeding state of the sheets fed by the sheet feeding means, and a controller that controls an air-sending state on the basis of the result of detection by the sheet-feeding-state detection sensor are provided. The controller includes sheet slip amount calculation means and double-feeding determining means for determining whether overlapping of sheets occurs. A double-feeding detection sensor is used in a normal paper feeding mode, and a double-feed detection sensor is used in a preliminary paper feeding mode.

Furthermore, a technique for setting the amount of assist air for paper has also been known (see, for example, Japanese Unexamined Patent Application Publication No. 2011-140359). In this technique, while an image is not being formed, the behavior of paper is detected with air-sending means operating, the amount of air that is able to properly assist the paper is determined on the basis of the detection result, and the determined amount of air is set as the amount of air used for normal paper feeding.

SUMMARY

An image forming apparatus makes adjustments relating to transport of paper according to, for example, paper type. In the case where an adjustment relating to supply of paper by, for example, air-sending, is performed as an adjustment relating to transport of paper, to reduce misregistration of an image caused by unstable traveling of paper while being transported, positioning of paper is performed after paper is supplied. However, if adjustments relating to transport of paper are performed every time, for example, processing regarding paper setting is performed at the image forming apparatus, the workload required for the adjustments relating to transport of paper increases every time the adjustments are performed. For example, even if adjustment values for an adjustment relating to supply of paper and paper positioning are stored so that they are able to be reused, it is difficult to determine which adjustment value is to be used for which adjustment on the basis of the adjustment values that have simply been stored. Thus, the workload required for adjustments relating to transport of paper increases every time the adjustments are performed.

Aspects of non-limiting embodiments of the present disclosure relate to providing an image forming apparatus, an image forming method, and a non-transitory computer readable medium that are capable of assisting to reduce the workload required for adjustments relating to transport of paper, compared to the case where an adjustment value for transport of paper is not stored in association with the type of paper and the like.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a processor configured to: receive paper information on a type of paper on which an image is formed; acquire assist information about assistance to supply the paper by supplying gas to the paper and adjustment information about positioning of the paper after assistance to supply the paper is performed, the assist information and the adjustment information corresponding to the received paper information and relating to transport of the paper; and perform control for storing the paper information, the assist information, and the adjustment information in association with one another into a memory.

BRIEF DESCRIPTION OF THE DRAWINGS

Exemplary embodiments of the present disclosure will be described in detail based on the following figures, wherein:

FIG. 4 is a diagram illustrating an example of print parameters for transport of paper in an exemplary embodiment;

FIG. 5 is a diagram illustrating an example of information on print parameters for transport of paper in an exemplary embodiment;

FIG. 10 is a diagram illustrating an example of search conditions for paper information in an exemplary embodiment.

DETAILED DESCRIPTION

Hereinafter, exemplary embodiments of the present disclosure will be described in detail with reference to drawings. Components and processes with the same operations, effects, and functions are denoted by the same reference signs throughout the drawings, and redundant explanation may be omitted in an appropriate manner. Each of the drawings is merely illustrated schematically to such an extent that a technique of the present disclosure is able to be easily understood. Hence, the present disclosure is not intended to be limited only to illustrated examples. In addition, in an exemplary embodiment, explanation for a configuration not directly related to the present disclosure or a known configuration may be omitted.

In the present disclosure, the concept of "air-assist" includes a paper feeding assisting function for performing a paper adjustment for assisting to feed paper in relation to transport of paper by at least one of air-sending (for example, supply of positive pressure gas) and attraction (for example, supply of air by negative pressure). Furthermore, the concept of "alignment" includes a positioning function for adjusting the position of paper in relation to transport of paper to form an image at a predetermined position on transported paper.

Figure 1:
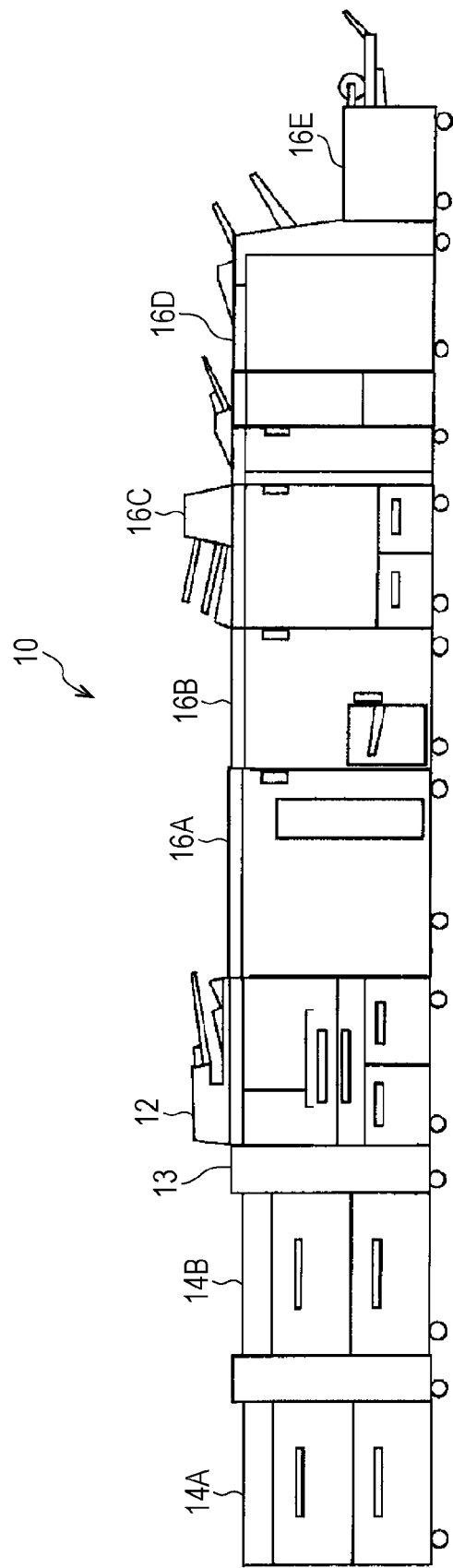
FIG. 1 is a diagram illustrating a schematic configuration of an image forming system according to an exemplary embodiment.

FIG. 1 is a diagram illustrating a schematic configuration of an image forming system 10 as an example of an image forming apparatus according to an exemplary embodiment of the present disclosure.

The image forming system 10 includes an image forming apparatus 12 including an image forming unit that forms an image, a connecting device 13, paper feeding devices 14A and 14B, and postprocessing devices 16A, 16B, 16C, 16D, and 16E as finishers.

The paper feeding devices 14A and 14B are paper feeding devices for supplying paper to the image forming apparatus 12. The postprocessing devices 16A, 16B, 16C, 16D, and 16E are devices that perform postprocessing on paper on which an image has been formed by the image forming apparatus 12 and then eject the processed paper. The postprocessing devices 16A, 16B, 16C, 16D, and 16E perform, for example, stapling, punching, folding (half-fold, tri-fold), gluing, trimming, and the like.

The image forming apparatus 12 forms (prints) an image on paper by forming the image, which is based on image data, on an intermediate transfer body and transferring the image formed on the intermediate transfer body onto the paper.

Figure 2:
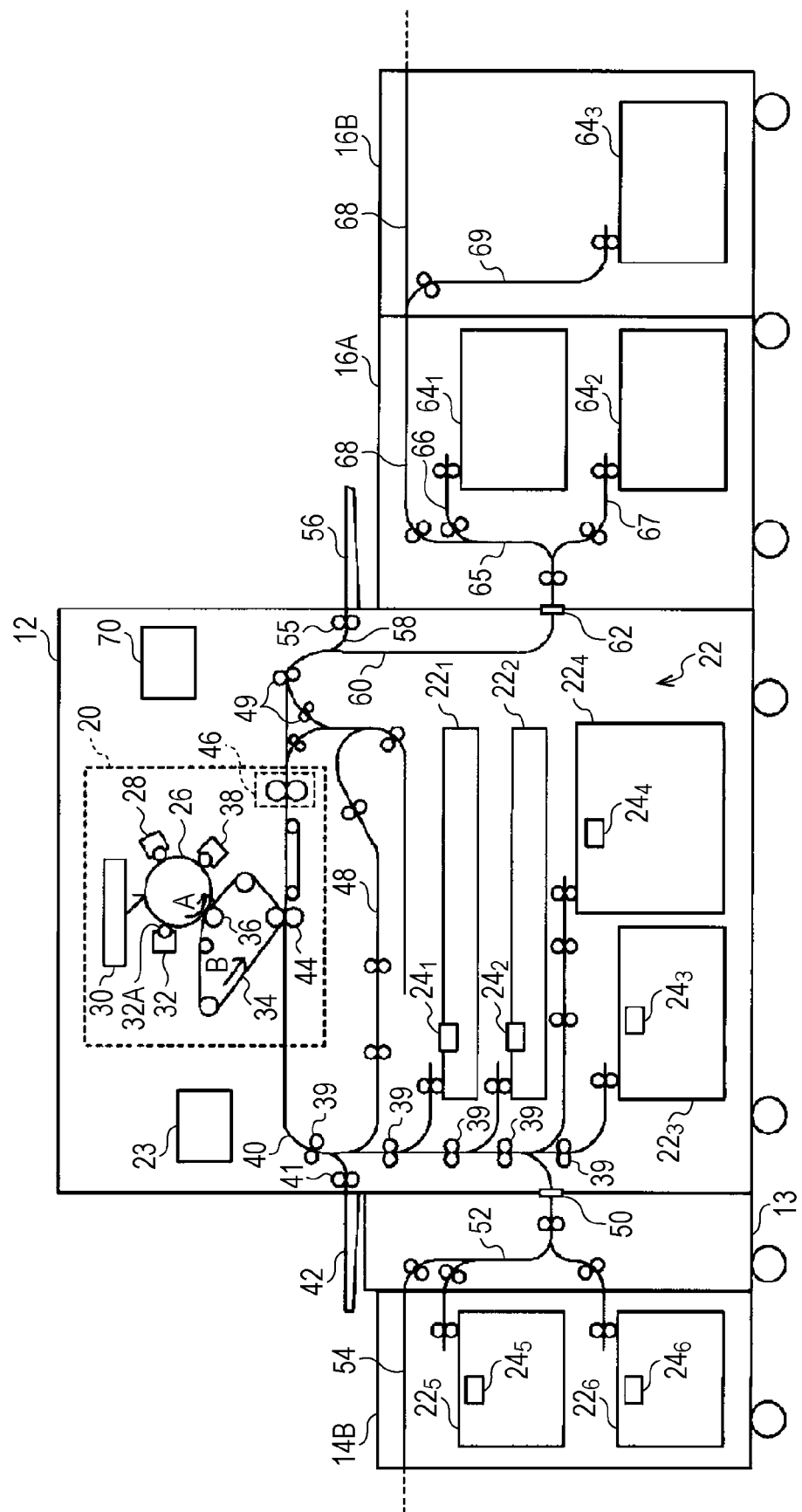
FIG. 2 is a schematic configuration diagram illustrating an example of an image forming apparatus according to an exemplary embodiment.

FIG. 2 is a schematic configuration diagram illustrating an example of the image forming apparatus 12 according to an exemplary embodiment. The image forming apparatus 12 according to this exemplary embodiment includes an image forming unit 20 that forms an image on paper and paper storage units 22 for supplying stored paper to the image forming unit 20.

The paper storage units 22 are provided to supply paper P stored therein to the image forming unit 20. In this exemplary embodiment, four paper storage units $22_1$, $22_2$, $22_3$, and $22_4$ are provided inside the image forming apparatus 12. Hereinafter, the paper storage units $22_1$, $22_2$, $22_3$, and $22_4$ will be collectively referred to as paper storage units 22 in the case where they do not need to be distinguished from one another. Meanwhile, subscripts "1" to "4" will be used in the case where the paper storage units $22_1$, $22_2$, $22_3$, and $22_4$ need to be distinguished from one another.

The paper storage units 22 are each capable of changing the size of stored paper P by adjusting the position of an internal partitioning member or the like (not illustrated in FIG. 2) and store the stacked paper P. In this exemplary embodiment, the paper P is stacked in trays (not illustrated in FIG. 2). By using a motor or the like (not illustrated in FIG. 2), each of the paper storage unit 22 lifts up the tray in which the paper P is stacked.

The paper storage unit 22 includes an air-assist part 24. The air-assist part 24 prevents double feeding of the paper P caused by static electricity, moisture, or the like and supplies gas such as air to the paper storage unit 22 to assist to take out the paper P. When taking out paper from the tray to a sheet transport path, the air-assist part 24 blows gas such as warm air or cool air from a predetermined position (for example, a side face) of the paper sheet pile stacked in the tray to create a gap between sheets of the paper so that the uppermost sheet of paper P is separated from the sheet below, and maintains the humidity of the stored paper P at a constant level. That is, when taking out paper from the tray to the transport path, the air-assist part 24 performs, as air-assist, which is assisting processing relating to transport of paper, processing for, for example, blowing gas from a side face or the like of a paper sheet pile to create a gap between sheets of the paper so that the uppermost sheet of paper is separated from the sheet below.

The gas supplied from the air-assist part 24 is not necessarily air. However, for an easier explanation, the case where air is supplied will be described below.

The uppermost sheet of paper P taken out of the tray is transported through a sheet transport path 40, via a plurality of roller pairs 39, to the image forming unit 20.

Furthermore, a manual feed tray 42 for manually transporting the paper P is provided at the image forming apparatus 12. The paper P placed in the manual feed tray 42 is guided through a manual feed roller 41 and the roller pair 39 inside the image forming apparatus 12 onto the sheet transport path 40 and then transported to the image forming unit 20 through the sheet transport path 40.

Furthermore, a sheet reception port 50 that receives the paper P supplied from the paper feeding devices 14 is provided below the manual feed tray 42 in the image forming apparatus 12 according to this exemplary embodiment. The paper P received through the sheet reception port 50 is transported through the sheet transport path 40 to the image forming unit 20.

The image forming apparatus 12 according to this exemplary embodiment includes an alignment unit 23 that adjusts the position of the paper P transported through the sheet transport path 40 to the image forming unit 20. The alignment unit 23 adjusts the position of paper to be transported after the paper is supplied so that misregistration of an image on the paper caused by unstable transport of paper, such as slip or skew of paper while being transported, is reduced. In the alignment unit 23, for example, at least one of an offset adjustment and a skew adjustment is used as alignment for adjusting the position of the paper P. In the offset adjustment, an adjustment for displacing paper being transported in at least one of a transport direction, a direction opposite the transport direction, and a direction crossing the transport direction (for example, a horizontal direction) with respect to the reference position of the paper being transported by a predetermined distance is performed. In the skew adjustment, an adjustment for rotating paper by an angle determined in advance based on the angle formed by a direction of transport of paper before the adjustment and the longitudinal direction of the paper is performed.

The air-assist part 24 is an example of a paper supply assisting unit in an exemplary embodiment of the present disclosure. The alignment unit 23 is an example of a positioning unit in an exemplary embodiment of the present disclosure.

The image forming unit 20 includes a photoreceptor 26, a charger 28, a light beam scanner 30, a developer 32, an intermediate transfer body 34, a transfer device 36, a charge remover/cleaner 38, a transfer device 44, and a fixing device 46.

The photoreceptor 26 rotates in the direction opposite the direction of arrow A at a predetermined speed. The charger 28 for charging the circumferential face of the photoreceptor 26 is provided near the photoreceptor 26. The light beam scanner 30 applies light beams based on image data on the circumferential face of the photoreceptor 26 charged by the charger 28 and forms an electrostatic latent image. The developer 32 includes a roller 32A. The developer 32 causes the roller 32A to attach toner stored inside the roller 32A to the electrostatic latent image formed on the circumferential face of the photoreceptor 26 to perform developing.

The intermediate transfer body 34 is an endless belt provided below the photoreceptor 26 and is rotated by a plurality of rollers in the direction of arrow B at the same rotation speed of that of the photoreceptor 26. The transfer device 36 is arranged at the position where the photoreceptor 26 and the intermediate transfer body 34 are in contact with each other. A toner image on the circumferential face of the photoreceptor 26 is transferred to the intermediate transfer body 34. The charge remover/cleaner 38 has a function for removing the electric charge from the circumference face of the photoreceptor 26 and a function for removing residual toner remaining on the circumferential face of the photoreceptor 26.

Meanwhile, the paper P transported through the sheet transport path 40 is fed to between the intermediate transfer body 34 and the transfer device 44, and a toner image on the intermediate transfer body 34 is transferred onto the paper P by the transfer device 44. Toner on the paper P to which the toner image has been transferred is melted and fixed by the fixing device 46, and the paper P is ejected outside the image forming apparatus 12 by an ejection roller pair 49.

The image forming apparatus 12 includes an ejection tray 56 to which the paper P on which an image is formed is ejected. The paper P on which an image is formed is caused to be ejected through a sheet transport path 58 by the ejection roller pair 49 and an ejection roller 55 inside the image forming apparatus 12 to the ejection tray 56. Furthermore, a sheet ejection port 62 through which the paper P is ejected to the postprocessing devices 16 is provided below the ejection tray 56 in the image forming apparatus 12 according to this exemplary embodiment. In the case where the paper P on which an image is formed is ejected to the postprocessing devices 16, the paper P travels through a sheet transport path 60 and is transported through the sheet ejection port 62 to the postprocessing device 16A.

The image forming apparatus 12 also includes a reverse path 48 for double-sided printing. The paper P on one side of which an image is formed is reversed through the reverse path 48 and transported to the intermediate transfer body 34 again, and the image is transferred to the paper P.

Furthermore, the paper feeding device 14A (not illustrated in FIG. 2) and the paper feeding device 14B are connected through the connecting device 13 to the image forming apparatus 12. A paper supply port, which is identical to the sheet reception port 50 of the image forming apparatus 12, is provided at the connecting device 13.

The paper feeding device 14B in this exemplary embodiment includes two paper storage units 22 (paper storage units $22_3$ and $22_6$). The paper storage units 22 of the paper feeding device 14B have substantially the same configuration as that of the paper storage units 22 inside the image forming apparatus 12. The taken up paper P travels through a sheet transport path 52, is supplied through the paper supply port, which is identical to the sheet reception port 50, and is received inside the image forming apparatus 12. Then, the paper P is supplied to the image forming unit 20.

The display unit 14, which is not illustrated in FIG. 2, has substantially the same configuration as that of the paper feeding device 14B. The paper P transported from the paper feeding device 14A travels through a sheet transport path 54, is supplied through the paper supply port (sheet reception port 50), and is received inside the image forming apparatus 12. Then, the paper P is supplied to the image forming unit 20.

Furthermore, the postprocessing devices 16A, 16B, 16C, 16D, and 16E (postprocessing devices 16C to 16E are not illustrated in FIG. 2), which are finishers, are connected to the image forming apparatus 12. A sheet reception port 62 that corresponds to the sheet ejection port 62 of the image forming apparatus 12 is provided at the postprocessing device 16A.

The postprocessing device 16A in this exemplary embodiment includes two sheet ejection units 64 (sheet ejection units $64_1$ and $64_2$). The paper P on which the image is formed is received through the sheet reception port (sheet ejection port) 62 inside the postprocessing device 16A and is ejected through a sheet transport path 66 to the sheet ejection unit $64_1$. Furthermore, the paper P is ejected through a sheet transport path 67 to the sheet ejection unit $64_2$. Furthermore, the paper P is transported through a sheet transport path 68 to the postprocessing device 16B.

The postprocessing device 16B includes a sheet ejection unit 64 (sheet ejection unit $64_3$). The paper P on which the image is formed is ejected through a sheet transport path 69 to the sheet ejection unit $64_3$. Furthermore, the paper P is transported through the sheet transport path 68 to the postprocessing devices 16C to 16E.

As with the postprocessing devices 16A and 16B, the postprocessing devices 16C to 16E, which are not illustrated in FIG. 2, each include a sheet ejection unit 64 and a corresponding sheet transport path. The paper P transported through the sheet transport path 68 is ejected through the corresponding sheet transport path to the corresponding sheet ejection unit 64.

In this exemplary embodiment, the image forming apparatus 12 is capable of performing paper adjustment processing for assisting (air-assist) supply of paper in relation to transport of paper and positioning processing for positioning (alignment) of paper so that an image is formed at a predetermined position on transported paper.

Figure 3:
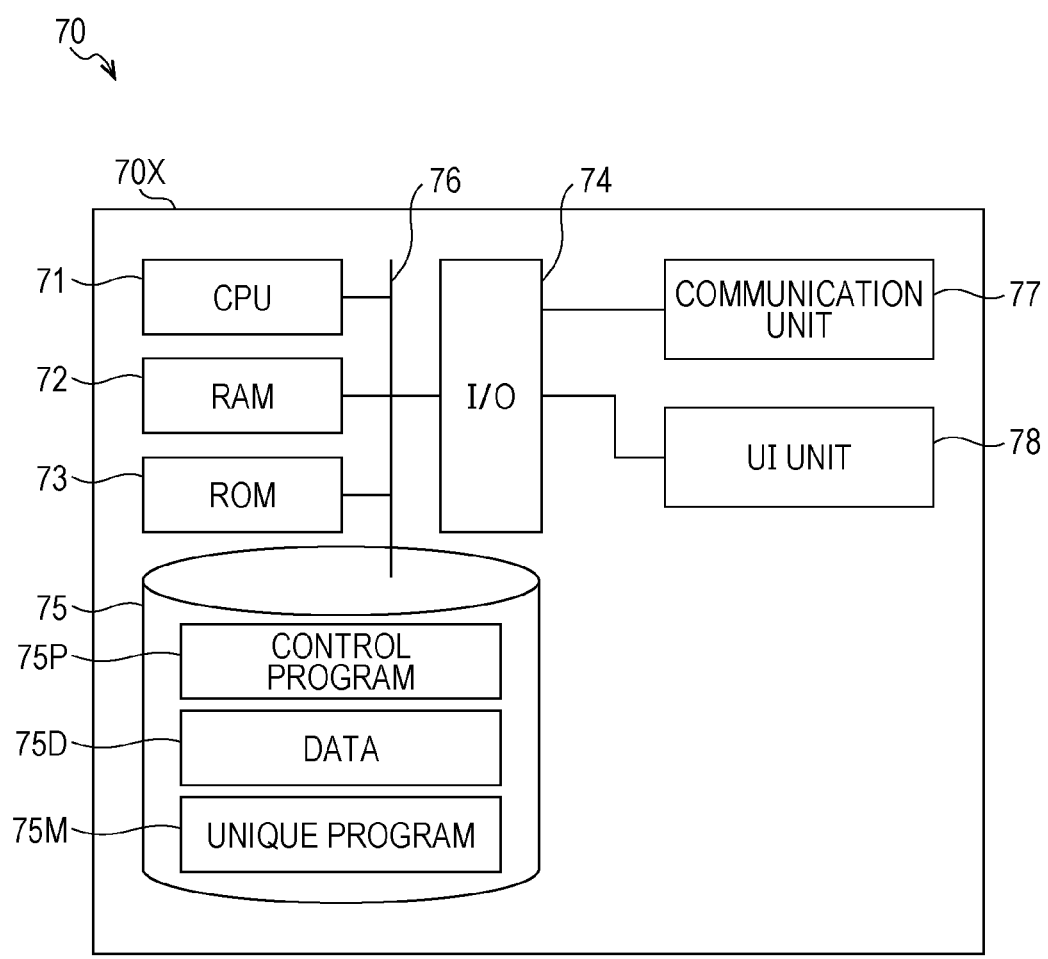
FIG. 3 is a diagram illustrating an example of an electrical configuration of an image forming apparatus according to an exemplary embodiment.

Next, an example of an electrical configuration of the image forming apparatus 12 will be described with reference to FIG. 3. For example, the image forming apparatus 12 may be implemented with a configuration including a general-purpose computer apparatus such as a server or a personal computer (PC).

The image forming apparatus 12 includes a controller 70 that controls the entire image forming apparatus 12. The controller 70 includes a computer body 70X. The computer body 70X includes a central processing unit (CPU) 71, a random access memory (RAM) 72, a read-only memory (ROM) 73, and an input/output port (I/O) 74 that are connected to one another via a bus 76. A memory 75 is connected, as an auxiliary storing device that may be implemented by a hard disk drive (HDD), a nonvolatile flash memory, or the like, to the bus 76. Furthermore, a communication unit 77 and a user interface (UI) unit 78 as an operation unit including a display device such as a touch panel are connected to the I/O 74. Various data 75D to be used by the image forming apparatus 12 are stored in the memory 75.

The UI unit 78 is an example of a display in an exemplary embodiment of the present disclosure.

The communication unit 77 is connected to units relating to above-described image formation configuring the image forming apparatus 12 and is capable of transmitting and receiving data and commands to control the units of the image forming apparatus 12. The communication unit 77 is configured to be capable of communicating with an external apparatus. Furthermore, a unique program 75M for implementing various functions of the units relating to image formation in the image forming apparatus 12 is also stored in the memory 75. The CPU 71 reads the unique program 75M from the memory 75, loads the read unique program 75M onto the RAM 72, and executes a process in accordance with the unique program 75M. Accordingly, the image forming apparatus 12 executing the unique program 75M operates in such a manner that the above-described various functions relating to image formation are able to be implemented.

A control program 75P for making adjustments relating to transport of paper described below is stored in the memory 75. The CPU 71 reads the control program 75P from the memory 75, loads the read control program 75P onto the RAM 72, and executes a process in accordance with the control program 75P. Accordingly, the computer body 70X executing the control program 75P operates as the controller 70. The control program 75P may be supplied by a recording medium such as a compact disc-read only memory (CD-ROM).

Before forming an image on paper, the image forming apparatus 12 makes adjustments relating to transport of paper in accordance with the type of paper and the like. Paper is transported based on adjustment values for adjusted transport of paper, and an image is formed on the transported paper. However, in the case where an adjustment relating to supply of paper is performed by air-sending or the like, after paper on which an adjustment relating to supply of paper has been performed by air-sending or the like is supplied, positioning of paper is performed so that misregistration of an image caused by slip and skew of paper being transported may be reduced. However, if the adjustments relating to transport of paper are performed every time processing regarding paper setting is performed, the workload required for the adjustments increases. Furthermore, it is difficult to reuse adjustments value on the basis of adjustment values for adjustments that have simply been stored. In this exemplary embodiment, adjustment values for transport of paper corresponding to types of paper or the like are able to be reused, and a reduction in the workload required for adjustments relating to transport of paper is achieved.

In this exemplary embodiment, to reduce the workload required for adjustments relating to transport of paper, paper information included in a print parameter containing adjustment values for transport of paper and set values, which are adjustment values for transport of paper corresponding to the paper information, are stored in association with each other. Set values for an air-assist adjustment value and an alignment adjustment value are used as the set values, which are adjustment values for transport of paper. That is, as a print parameter for transport of paper, information in which paper information, information indicating an air-assist adjustment value, and information indicating an alignment adjustment value are associated with one another is stored in the memory 75 in such a manner that these information items are able to be referred to as the data 75D.

The concept of paper information includes type and characteristics of paper such as material, weight, and size. An air-assist adjustment value is an example of assist information about assistance for supply of paper in an exemplary embodiment of the present disclosure, and an alignment adjustment value is an example of adjustment information about positioning of paper in an exemplary embodiment of the present disclosure. A print parameter is an example of an information set in an exemplary embodiment of the present disclosure.

FIG. 4 is a diagram illustrating an example of print parameters for transport of paper. In the example illustrated in FIG. 4, as print parameters in which information items on transport of paper are associated with one another, a table 90 in which paper information, information about an air-assist adjustment value, and information about an alignment adjustment value are associated with one another is illustrated. In the table 90, at least paper information, information about an air-assist adjustment value, and information about an alignment adjustment value are associated with one another.

As illustrated in FIG. 4, in the table 90, an alignment adjustment value is associated with paper information and an air-assist adjustment value. Paper information includes a plurality of attribute information items. Attribute information is an example of information capable of identifying paper information indicating paper on which an image is formed. In this exemplary embodiment, information about paper size, information about weight such as basis weight, information about paper type, and information about the surface state (coating) of paper are used as attribute information items. For example, as first paper information, an attribute information item about paper size with an information value "A4", an attribute information item about weight with an information value "80 gsm", an attribute information item about paper type with an information value "Plain", and an attribute information item about the surface state (coating) of paper with an information value "Uncoat" are indicated.

Furthermore, as an air-assist adjustment value, multiple adjustment values (a first adjustment value and so on) may be stored. As air-assist, for example, when paper is taken out of a tray to a transport path, air is blown from a side face or the like of a paper sheet pile. In this exemplary embodiment, the case where transport assistance to provide a gap between sheets of paper by blowing air at the same or different air volumes from a plurality of side faces is conducted will be described. Furthermore, the image forming apparatus 12 includes a plurality of fans arranged at different positions to blow air to paper and sets air volumes for the plurality of fans, so that assistance to transport paper is conducted. The plurality of fans may be arranged anywhere near paper. As is clear from the table 90, an air-assist adjustment value includes set values (air-assist adjustment values) for fans at different positions, for example, the first to nth fans. The minimum to maximum air volumes may be classified into multiple levels such as high, medium, and low, and the value "high", "medium", or "low" may be set as an air-assist adjustment value. Alternatively, a value indicating a class number value according to the classification may be set as an air volume.

Furthermore, in the table 90, an alignment adjustment value is stored in association with paper information and an air-assist adjustment value. As alignment, for example, at least one of an offset adjustment and a skew adjustment of paper is performed. An alignment adjustment may be performed based on the position at which an image is formed at the image forming apparatus 12 or may be performed during transport of paper. Thus, as an alignment adjustment value, a profile (alignment profile) containing one or more adjustment parts and adjustment amounts may be stored. For example, an example of information "AL1-1" for an alignment profile indicating an adjustment part and an alignment amount as an alignment adjustment value corresponding to first paper information and a first air-assist adjustment value is illustrated.

Information stored as a print parameter for transport of paper in an exemplary embodiment of the present disclosure is not limited to the table 90 illustrated in FIG. 4. For example, a print parameter for transport of paper may be stored as information such as a database in which paper information, an air-assist adjustment value, and an alignment adjustment value are associated with one another (FIG. 5).

FIG. 5 is a diagram illustrating an example of information of print parameters for transport of paper. In the example illustrated in FIG. 5, as print parameters for transport of paper, a database 92 containing a record in which paper information, information about an air-assist adjustment value, and information about an alignment adjustment value are associated with one another is illustrated. In the database 92, at least paper information, information about an air-assist adjustment value, and information about an alignment adjustment value are associated with one another.

Next, a control process performed by the image forming apparatus 12 according to this exemplary embodiment for adjustments relating to transport of paper will be described in detail.

The entire image forming apparatus 12 is controlled by the controller 70. In this exemplary embodiment, when the image forming apparatus 12 performs an image forming process, to reduce the workload required for adjustments relating to transport of paper, processing for storing a print parameter is performed so that adjustment values for transport of paper corresponding to the type of paper and the like are able to be reused.

Figure 6:
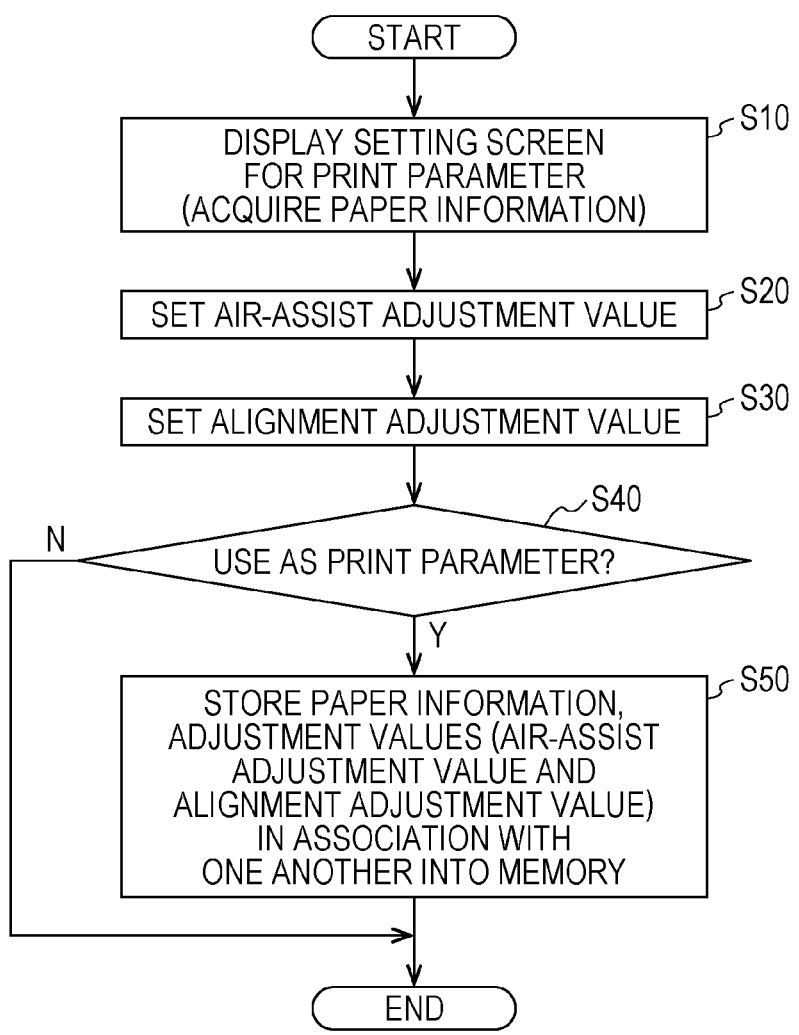
FIG. 6 is a flowchart illustrating an example of a process performed by an image forming apparatus for storing a print parameter in an exemplary embodiment.

FIG. 6 is a flowchart illustrating an example of a control process performed by the image forming apparatus 12 for storing a print parameter containing adjustment values for transport of paper. The control process illustrated in FIG. 6 represents a process performed, prior to forming an image, for storing a print parameter containing adjustment values for transport of paper. The control process illustrated in FIG. 6 is performed when an instruction from a user is received through the UI unit 78.

When the communication unit 77 receives an instruction for setting (for example, creating or editing) a print parameter from a user, the CPU 71 starts a process for setting a print parameter and performs processing for displaying a setting screen for a print parameter in step S10. That is, in step S10, a setting screen for a print parameter is displayed on the UI unit 78, and the user sets a print parameter. In step S10, when at least paper information is set by the user, the CPU 71 acquires the set paper information.

In this exemplary embodiment, the case where the setting screen for a print parameter is displayed on the UI unit 78 and a print parameter is set will be described. However, a print parameter is not necessarily displayed on the UI unit 78. Obviously, for example, the image forming apparatus 12 may communicate with an external terminal (for example, a display device) and transmit display information to the external terminal, so that the display information is displayed on the external terminal. It is also obvious that information set at an external terminal (for example, a specifying device) may be received at the image forming apparatus 12.

Figure 7:
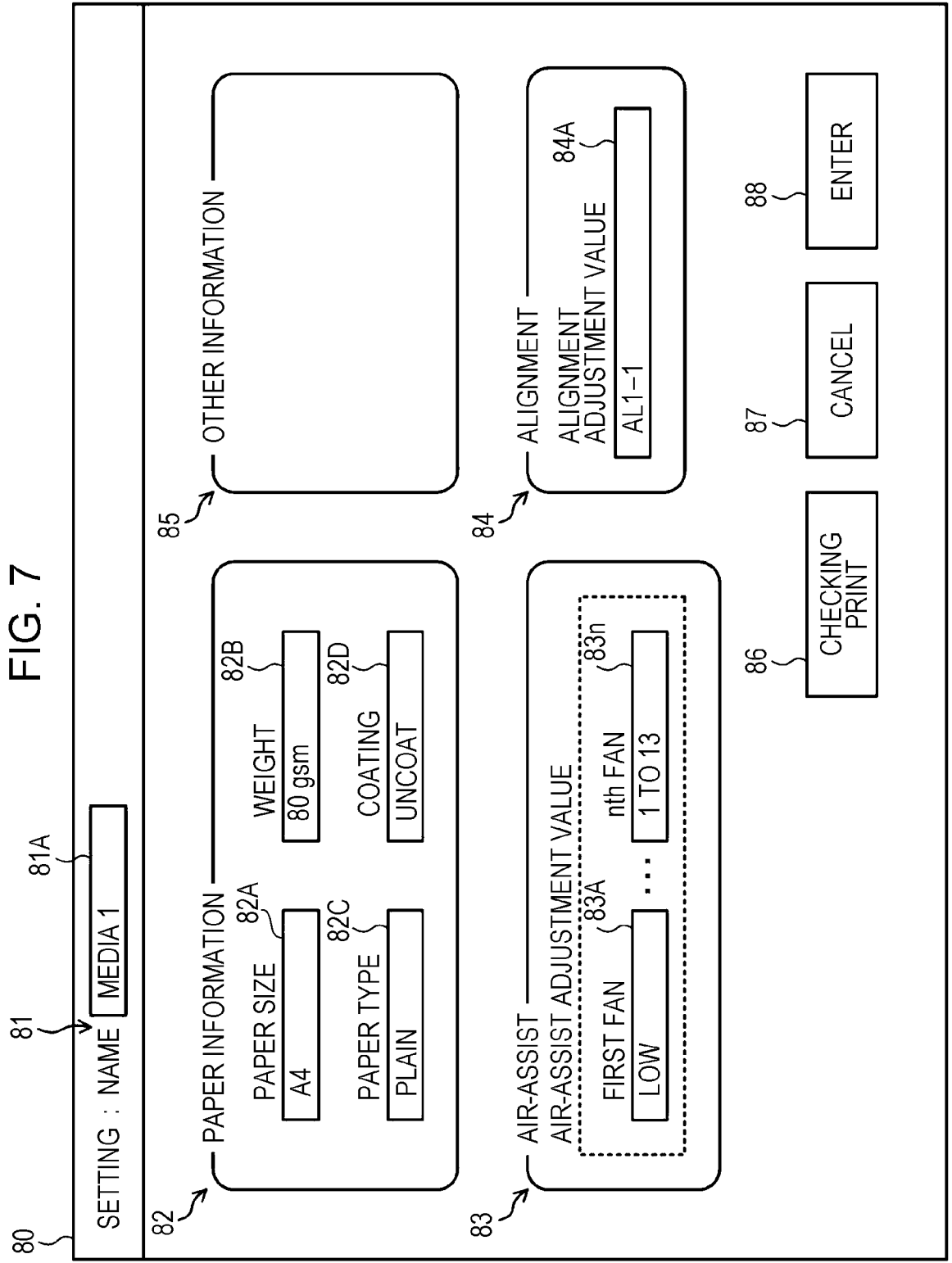
FIG. 7 is a conceptual diagram illustrating an example of a setting screen for a print parameter in an exemplary embodiment.

FIG. 7 is a conceptual diagram illustrating an example of a setting screen for a print parameter displayed on the UI unit 78. A setting screen may be used as a creating processing screen displayed at the time of processing for creating a print parameter and an editing processing screen displayed at the time of processing for editing a print parameter.

As illustrated in FIG. 7, a setting screen 80 includes a display region 81 in which the name of a print parameter is displayed. The display region 81 includes a setting region 81A in which inputting and updating for setting of a name is able to be performed. In FIG. 7, an example in which a print parameter name "MEDIA 1" is input as a set value is illustrated.

Furthermore, the setting screen 80 includes display regions in which paper information, information about air-assist, information about alignment, and other information items are displayed as information indicated as a print parameter. The display regions each include a setting region for setting a set value.

Specifically, the setting screen 80 includes a display region 82 in which information about paper information is displayed. The display region 82 includes setting regions 82A to 82D for setting set values of attribute information included in the paper information. The attribute information is an example of information capable of identifying paper information indicating paper on which an image is formed. In this exemplary embodiment, attribute information items include information about paper size, information about weight such as basis weight, information about paper type, and information about the surface state (coating) of paper. In FIG. 7, an example in which "A4" as paper size, "80 gsm" as weight, "Plain" as paper type, and "Uncoat" as the surface state (coating) of paper are input as set values is illustrated.

Furthermore, the setting screen 80 includes a display region 83 in which information about air-assist is displayed. The display region 83 includes setting regions 83A to 83*n* for setting set values (air-assist adjustment values). As described above, as air-assist, the image forming apparatus 12 includes a plurality of fans arranged at different positions to blow air to paper and sets air volumes for the plurality of fans, so that assistance to transport paper is conducted. In the example of FIG. 7, as an example of a plurality of fans arranged at different positions, the setting regions 83A to 83n for setting set vales (air-assist adjustment values) for the first to nth fans are illustrated. The set values (air-assist adjustment values) from the minimum to maximum air volumes may be classified into multiple levels such as high, medium, and low, and the value "high", "medium", or "low" may be set (see the setting region 83A) as an air-assist adjustment value. Alternatively, a value indicating a class number value according to the classification may be set (see the setting region 83n).

Furthermore, the setting screen 80 includes a display region 84 in which information about alignment is displayed. The display region 84 includes a setting region 84A for setting a set value (alignment adjustment value). As described above, as alignment, a profile (alignment profile) for at least one of an offset adjustment and a skew adjustment of paper may be set. In FIG. 7, as an example of a set value (alignment adjustment value), "AL1-1" indicating an alignment profile is illustrated.

Furthermore, the setting screen 80 includes a checking print button 86, a cancel button 87, and an enter button 88. The checking print button 86 is an instruction button, which will be described later, for instructing processing for printing a print for checking whether or not to use a print parameter. The cancel button 87 is an instruction button for instructing cancelation processing for deleting a set value set as a print parameter and recovering the immediately previous set value. The enter button 88 is an instruction button for instructing determination of a set value to be a print parameter.

A display region 85 is a region for displaying and setting set values other than the set values described above and included in a print parameter relating to image forming processing. Set values displayed and set in the display region 85 include normal set values in the image forming apparatus 12. Thus, explanation for the display region 85 will be omitted.

An image formed on a print for checking whether or not to use a print parameter is an example of a checking image in an exemplary embodiment of the present disclosure.

When acquiring the paper information in step S10 illustrated in FIG. 6, the CPU 71 proceeds to step S20. In step S20, the CPU 71 performs, as the processing for setting a print parameter, processing for setting an air-assist adjustment value corresponding to the set paper information. In step S20, when an air-assist adjustment value is set by the user, the CPU 71 acquires the set air-assist adjustment value.

Specifically, in step S20, the CPU 71 acquires air-assist adjustment values, which are set values for the first to nth fans set by the user. For example, the CPU 71 acquires air-assist adjustment values for the fans input in the setting regions 83A to 83n by the user. Furthermore, as described above, an air-assist adjustment value may be selected from a plurality of predetermined air-assist adjustment values.

Next, after completing setting for the air-assist adjustment value, the CPU 71 proceeds to step S30. In step S30, the CPU 71 performs processing for setting an alignment adjustment value corresponding to the set paper information. In step S30, when an alignment adjustment value is set by the user, the CPU 71 acquires the set alignment adjustment value.

Specifically, in step S30, the CPU 71 acquires the alignment adjustment value, which is a set value set by the user. For example, the CPU 71 acquires an alignment profile input to the setting region 84A by the user. As an alignment profile, one of a plurality of predetermined alignment profiles (alignment adjustment values) may be selected.

Next, after completing setting for the alignment adjustment value, the CPU 71 proceeds to step S40. In step S40, the CPU 71 determines whether or not the set paper information, air-assist adjustment value, and alignment adjustment value are to be used as a print parameter. That is, the CPU 71 determines whether or not the air-assist adjustment value and the alignment adjustment value that are associated with the set paper information are to be used as a print parameter. In step S40, the determination as to whether or not the adjustment values are to be used as a print parameter may be performed in accordance with instruction information through the UI unit 78 by the user. That is, in the case where the instruction information through the UI unit 78 indicates that the adjustment values are to be used as a print parameter, the CPU 71 obtains an affirmative determination result in step S40. In the case where the instruction information indicates that the adjustment values are not to be used as a print parameter, the CPU 71 obtains a negative determination result in step S40. Specifically, in the case where the enter button 88 is pressed, the CPU 71 determines that the adjustment values are to be used as a print parameter, and obtains an affirmative determination result in step S40. In the case where the cancel button 87 is pressed, the CPU 71 determines that the adjustment values are not to be used as a print parameter, and obtains a negative determination result in step S40. In the case where a negative determination result is obtained in step S40, the CPU 71 does not use (store) the air-assist adjustment value and alignment adjustment value that correspond to the set paper information as a print parameter, and ends the processing routine.

In contrast, in the case where an affirmative determination result is obtained in step S40, the CPU 71 performs storing processing in step S50, and ends the processing routine. In step S50, the CPU 71 stores the air-assist adjustment value and the alignment adjustment value that are associated with the set paper information into the memory 75 as a print parameter, and thus stores the paper information and the adjustment values. Storing of the print parameter into the memory 75 may be performed by, for example, storing a new print parameter or updating an existing print parameter in the table 90 (FIG. 4) or the database 92 (FIG. 5).

As described above, as adjustment values for transport of paper corresponding to paper information including information about the type of paper and the like, an air-assist adjustment value and an alignment adjustment value are stored in association with each other. Accordingly, paper information, an air-assist adjustment value, and an alignment adjustment value may be treated as a print parameter. With the use of a stored print parameter, adjustment values for transport of paper corresponding to set paper information may be used, and a reduction in the workload required for adjustments relating to transport of paper may be achieved.

In the case where a print parameter is set, a user may want to check an image formed on paper so that the user is able to determine whether or not an air-assist adjustment value and an alignment adjustment value that correspond to set paper information are to be used as a print parameter. The image forming apparatus 12 may perform a checking printing process for forming an image that reflects, as a print parameter, an air-assist adjustment value and an alignment adjustment value that correspond to set paper information.

Next, an example of a checking printing process will be described in detail.

Figure 8:
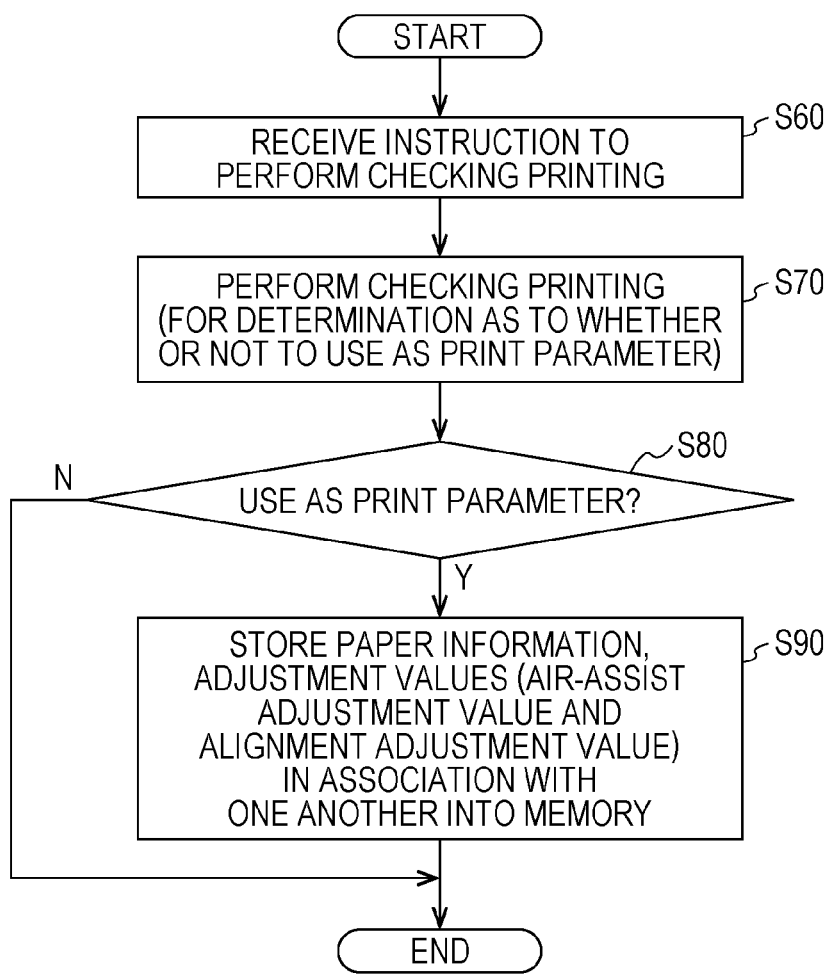
FIG. 8 is a flowchart illustrating an example of a checking printing process in an exemplary embodiment.

FIG. 8 is a flowchart illustrating an example of a checking printing process. The checking printing process illustrated in FIG. 8 is performed when an instruction for checking printing is received from a user through the UI unit 78, that is, when it is detected that the checking print button 86 is pressed on the setting screen (FIG. 7) for a print parameter.

When the checking print button 86 is pressed, the CPU 71 receives an instruction to perform checking printing of the set print parameter in step S60, and proceeds to step S70. In step S70, the CPU 71 performs processing for printing a checking print (checking print printing processing), that is, image forming processing for forming an image on paper reflecting the print parameter. In the checking print printing processing, as an image printed on paper, a predetermined test image in which the user is able to visually check alignment is used. The test image is stored in advance in the data 75D in the memory 75.

Next, after completing printing of the checking print, the CPU 71 proceeds to step S80. In step S80, the CPU 71 determines whether or not to use the print parameter in the printed checking print. That is, the CPU 71 determines whether or not the paper information for which checking printing has been instructed and the air-assist adjustment value and the alignment adjustment value that correspond to the paper information are to be used as a print parameter for paper. In step S80, the determination as to whether or not the print information and the adjustment values are to be used as a print parameter may be performed in accordance with instruction information through the UI unit 78 by the user. For example, in the case where the instruction information through the UI unit 78 indicates that the adjustment values are to be used as a print parameter, the CPU 71 obtains an affirmative determination result in step S80. In the case where the instruction information indicates that the adjustment values are not to be used as a print parameter, the CPU 71 obtains a negative determination result in step S80. Specifically, as described above, the CPU 71 obtains pressing of the enter button 88 or pressing of the cancel button 87. In the case where the enter button 88 is pressed, an affirmative determination result is obtained in step S80. In the case where the cancel button 87 is pressed, a negative determination result is obtained in step S80. In the case where a negative determination result is obtained in step S80, the CPU 71 does not use (store) the set paper information, air-assist adjustment value, and adjustment value as a print parameter, and ends the processing routine.

In contrast, in the case where an affirmative determination result is obtained in step S80, the CPU 71 performs storing processing in step S90, and ends the processing routine. In step S90, as in step S50 (FIG. 6) described above, the air-assist adjustment value and the alignment adjustment value that correspond to the set paper information are stored as a print parameter in the memory 75.

The information used for the determination processing in step S80 described above is an example of appropriateness information indicating whether or not to store information in an exemplary embodiment of the present disclosure.

A plurality of checking prints may be printed. For example, print parameters including different fine levels of predetermined alignment adjustment values may be printed as candidate print parameters, and the user may select a print parameter to be used from among the plurality of candidate checking prints.

As described above, by printing a checking print, the user is able to check whether or not a set print parameter represents set values (adjustment values) that are able to be used as a print parameter for paper on which an image is to be formed. Thus, the accuracy of a print parameter that is able to be reused, that is, a print parameter stored in the memory, may be increased. Therefore, with the use of a print parameter stored in the memory, a further reduction in the workload required for adjustments relating to transport of paper is achieved.

Adjustments relating to transport of paper for setting a print parameter are performed in accordance with paper information including the type of paper and the like. For example, in the case where an air-assist adjustment is performed at the time of supply of paper, an alignment adjustment for paper is also performed to reduce misregistration of an image. However, performing an operation relating to the alignment adjustment every time an operation relating to the air-assist adjustment is performed increases the workload for making adjustments relating to transport of paper. Furthermore, even if a print parameter is stored so that the print parameter is able to be reused, it is difficult to identify a print parameter appropriate for paper. Thus, the workload for identifying a print parameter increases. The image forming apparatus 12 according to this exemplary embodiment is configured to be capable of, when setting a print parameter for paper, setting an alignment adjustment value for reducing the workload of a user, compared to, for example, the case where an alignment adjustment value is set without taking into consideration an air-assist adjustment value corresponding to paper information.

Figure 9:
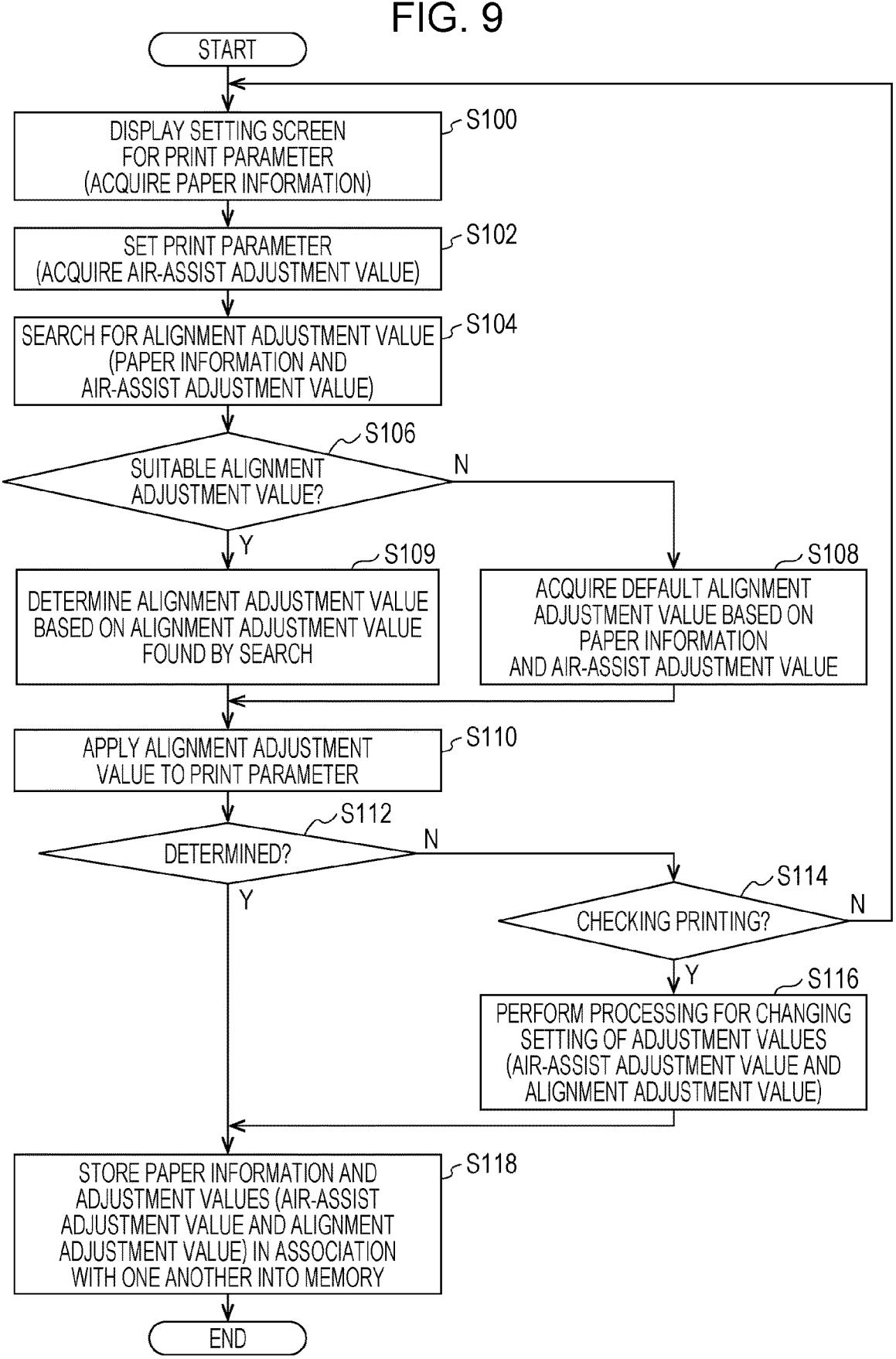
FIG. 9 is a flowchart illustrating an example of a process performed by an image forming apparatus for performing adjustments relating to transport of paper in an exemplary embodiment.

FIG. 9 is a flowchart illustrating an example of a control process performed by the image forming apparatus 12 for performing adjustments relating to transport of paper. The control process illustrated in FIG. 9 is performed, prior to forming an image, when a print parameter containing adjustment values for transport of paper to be transported is created or edited. The control process illustrated in FIG. 9 is performed when an instruction for creating or editing a print parameter is received from a user through the UI unit 78.

In step S100, as in step S10 (FIG. 6) described above, the CPU 71 performs processing for displaying a setting screen for a print parameter (FIG. 7). That is, the setting screen for a print parameter is displayed on the UI unit 78, and a user sets a print parameter. In step S100, when at least paper information is set by the user, the CPU 71 acquires the set paper information.

Next, in step S102, the CPU 71 performs, as processing for setting a print parameter, processing for setting an air-assist adjustment value corresponding to the set paper information. In step S102, when an air-assist adjustment value is set by the user, the CPU 71 acquires the set air-assist adjustment value.

Next, in step S104, the CPU 71 performs processing for searching print parameters stored in the memory 75 for an alignment adjustment value. Specifically, the CPU 71 extracts an alignment adjustment value corresponding to the paper information and air-assist adjustment value that have been set as described above from among existing print parameters stored in the memory 75. The processing for extracting an alignment adjustment value is performed by, for example, referring to the table 90 (FIG. 4) or the database 92 (FIG. 5) to identify an alignment adjustment value corresponding to the set paper information and air-assist adjustment value. In step S104, in the case where an alignment adjustment value is not found by search, information such as "not found" is obtained as a search result.

In step S104, searching for an alignment adjustment value may be performed in accordance with a predetermined search condition. The search condition is a condition for identifying a stored print parameter that matches set paper information and air-assist adjustment value. Under a search condition, a print parameter that matches the set paper information and air-assist adjustment value and a stored print parameter within a predetermined acceptable range are identified. An alignment adjustment value is found based on a print parameter identified according to the search condition.

With a search condition, an acceptable range for at least paper information may be defined. This is because an alignment adjustment may be applicable to slightly different pieces of paper information. Thus, an alignment adjustment value may be found as a candidate for such pieces of paper information with a slight difference. An acceptable range may be defined in stages or priority levels in the acceptable range may be provided.

FIG. 10 is a diagram illustrating an example of search conditions for paper information. "A" represents matching of attribute information in paper information as a search target. In this exemplary embodiment, "matching" includes being within a predetermined error range. "B" represents a case in which attribute information in paper information as a search target is within a predetermined acceptable range. In this exemplary embodiment, "being within an acceptable range" includes a case where, for example, control for image formation on paper and control for transport of paper are the same. "C" represents a case in which attribute information is within a limited acceptable range or criteria for attribute information are negligible. "Being within a limited acceptable range" represents a case in which all the values other than predetermined unsuitable values are applied. "Being negligible" represents a case in which all the attribute information values are applied.

For example, a first search condition is a condition that "matching" is obtained for all the attribute information items of paper information. A second search condition is a condition that "matching" is obtained for an attribute information item "paper size" and other attribute information items are "within an acceptable range". A fifth search condition is a condition that attribute information items "paper size" and "weight" are "within an acceptable range", an attribute information item "paper type" is, for example, "negligible", and "matching" is obtained for an attribute information item "coating".

Priority levels may be provided to a plurality of search conditions. In the example illustrated in FIG. 10, the priority levels may be decreased in the order of the first, second, third, fourth, and fifth search conditions. Furthermore, a search condition selected from a plurality of search conditions may be used.

Although the case where four types of attribute information are used as paper information has been described above, search conditions are not limited to those described above. For example, in the case where there are parameters that may be set for control for paper, for example, image formation control and transport control, the parameters may be included in a search condition. Furthermore, although the case where paper information is used for a search condition has been described above, a search condition is not limited to those described above. An air-assist adjustment value may also be used for a search condition.

Next, in step S106, the CPU 71 determines, based on the search result in step S104, whether or not there is a suitable alignment adjustment value. In the case where an alignment adjustment value is found by search, an affirmative determination result is obtained in step S106 and the process proceeds to step S109. In the case where no alignment adjustment value is found by search, a negative determination result is obtained in step S106 and the process proceeds to step S108.

In step S109, the CPU 71 determines an alignment adjustment value associated with the set paper information and air-assist adjustment value, on the basis of the alignment adjustment value obtained by the search in step S104. In the case where a plurality of alignment adjustment values are found by search as candidates, an alignment adjustment value selected by the user or an alignment adjustment value satisfying a predetermined setting condition is set. The predetermined setting condition is, for example, a condition for setting an alignment adjustment value with the highest priority.

In step S108, the CPU 71 acquires a predetermined default alignment adjustment value from the memory 75, and sets the acquired alignment adjustment value as an alignment adjustment value associated with the set paper information and air-assist adjustment value. An alignment adjustment value corresponding to paper information and an air-assist adjustment value is stored in advance in the memory 75 as the default alignment adjustment value.

Next, in step S110, the CPU 71 applies the alignment adjustment value determined in step S108 or step S109 to a print parameter.

In step S112, the CPU 71 determines whether or not the print parameter to which the alignment adjustment value has been applied is determined. In step S112, the determination as to whether or not the print parameter to which the alignment adjustment value has been applied is determined may be performed in accordance with instruction information through the UI unit 78 by the user. For example, in the case where instruction information through the UI unit 78 indicates determination of the print parameter, the CPU 71 obtains an affirmative determination result in step S112. In the case where the instruction information indicates non-determination of the print parameter, the CPU 71 obtains a negative determination result in step S112. Specifically, the CPU 71 acquires information indicating pressing of the above-mentioned checking print button 86, enter button 88, or cancel button 87. In the case where the enter button 88 is pressed, an affirmative determination result is obtained in step S112. In the case where the checking print button 86 or the cancel button 87 is pressed, a negative determination result is obtained in step S112. In the case where a negative determination result is obtained in step S112, the CPU 71 proceeds to step S114. In the case where an affirmative determination result is obtained in step S112, the CPU 71 proceeds to step S118.

In step S114, the CPU 71 determines, by determining whether or not the checking print button 86 is pressed, whether or not to print a checking print. In the case where a negative determination result is obtained in step S114, the CPU 71 returns to step S100. In the case where an affirmative determination result is obtained in step S114, the process proceeds to step S116.

In step S116, the CPU 71 performs processing for changing setting of adjustment values (the air-assist adjustment value and the alignment adjustment value), and proceeds to step S118. Specifically, as in steps S20 and S30, the CPU 71 performs processing for setting (changing) the air-assist adjustment value and the alignment adjustment value. In step S116, when the air-assist adjustment value and the alignment adjustment value are set (changed) by the user, the CPU 71 acquires the set (changed) air-assist adjustment value and determines the acquired air-assist adjustment value as a print parameter.

In step S118, the CPU 71 stores the paper information, the air-assist adjustment value, and the alignment adjustment value in association with one another, as the determined print parameter, into the memory 75, and ends the processing routine.

In this exemplary embodiment, the image forming apparatus 12 that includes an intermediate transfer body has been described in detail. However, the image forming apparatus 12 is not necessarily configured as described above. For example, the image forming apparatus 12 may be an image forming apparatus of a tandem system not including an intermediate transfer body. Furthermore, in this exemplary embodiment, the image forming apparatus 12 that forms an electrostatic latent image (image) by light beams has been described in detail. However, the image forming apparatus 12 is not necessarily configured as described above. For example, the image forming apparatus 12 may be an image forming apparatus of an inkjet type not using light beams.

As described above, in this exemplary embodiment, as adjustment values for transport of paper indicated by paper information, an air-assist adjustment value and an alignment adjustment value are stored in association with the paper information. Thus, in the stored information, the paper information, the air-assist adjustment value, and the alignment adjustment value may be treated as a print parameter. Accordingly, with the use of the stored print parameter, adjustment values for transport of paper corresponding to the set paper information are able to be used, and the workload required for adjustments relating to transport of paper may be reduced.

In this exemplary embodiment, a checking print reflecting the air-assist adjustment value and the alignment adjustment value associated with the paper information as a print parameter is printed. Thus, a user is able to check whether or not the set print parameter represents set values (adjustment values) that is able to be used as a print parameter for paper on which an image is to be formed, and the accuracy of a print parameter stored to be able to be reused may be increased. Accordingly, with the use of the print parameter stored in the memory, a further reduction in the workload required for adjustments relating to transport of paper may be achieved.

Furthermore, in this exemplary embodiment, paper information, an air-assist adjustment value, and an alignment adjustment value of a print parameter are stored in association with one another in the memory. Accordingly, when an air-assist adjustment is performed for paper information, for example, paper, an alignment adjustment value for an alignment adjustment corresponding to the adjustment is acquired, and the alignment adjustment value is applied to the print parameter. Thus, after the air-assist adjustment, an operation such as performing an alignment adjustment so that an alignment adjustment value is obtained or acquiring an alignment adjustment value desired by a user from among a plurality of print parameters may be reduced, and the workload required for adjustments relating to transport of paper may be reduced.

Furthermore, in the case where a deviation unique to an image forming apparatus occurs due to characteristics of paper or environment, a user needs to manually make a fine adjustment. In the image forming apparatus according to this exemplary embodiment, adjustment values at the time when an operation is performed by a user are stored in the memory. Thus, adjustment values unique to the image forming apparatus are able to be reused, and the workload required for adjustments relating to transport of paper in units of image forming apparatuses may be reduced.

Other Exemplary Embodiments

Specific exemplary embodiments of the present disclosure have been described above in detail. However, the present disclosure is not limited to the exemplary embodiments described above, and other various exemplary embodiments may be employed within the scope of the present disclosure.

Furthermore, in an exemplary embodiment described above, a process performed when a program stored in the memory is executed has been described. However, the process based on the program may be implemented by hardware.

Furthermore, a process in an exemplary embodiment described above may be stored as a program in a storing medium such as an optical disk and distributed.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
 a processor configured to:
  receive paper information on a type of paper on which an image is formed;
  acquire assist information about assistance to supply the paper by supplying gas to the paper and adjustment information about positioning of the paper after assistance to supply the paper is performed, the assist information and the adjustment information corresponding to the received paper information and relating to transport of the paper;
  determine whether the paper information, the assist information and the adjustment information are to be used as a parameter for image forming; and
  in response that the paper information, the assist information, and the adjustment information are determined to be used as the parameter for image forming, perform control for storing the paper information, the assist information, and the adjustment information in association with one another into a memory.

2. The image forming apparatus according to claim 1, wherein the processor is configured to:
  extract a specified information set out of a plurality of information sets each including the paper information, the assist information, and the adjustment information that are stored in association with one another in the memory;
  perform, based on assist information corresponding to the paper information in the extracted information set, control for an air assist that, when supplying paper stored in a paper storage space inside the image forming apparatus, supplies gas to the paper and assists to supply the paper; and
  perform, based on adjustment information corresponding to the paper information in the extracted information set, control for a positioning unit that adjusts to adjust a position of the paper.

3. The image forming apparatus according to claim 1, wherein the processor is configured to:
  acquire assist information set in association with the received paper info illation;
  extract, based on a plurality of information sets each including the paper information, the assist information, and the adjustment information that are stored in association with one another in the memory, adjustment information corresponding to the received paper information and the acquired assist information and acquire the extracted adjustment information; and
  set the received paper information, the set assist information, and the extracted adjustment information in association with one another as a new information set and store the set new information set into the memory.

4. The image forming apparatus according to claim 3, wherein the processor is configured to:
  in case where at least one of the assist information and the adjustment information is changed in accordance with the information set stored in the memory, acquire the changed information; and
  perform control for storing a new information set updated based on the changed information into the memory.

5. The image forming apparatus according to claim 4, wherein the processor is configured to:
  in a case where one of the assist information and the adjustment info nation is changed in accordance with the information set stored in the memory, acquire the changed one of the assist information and the adjustment information; and
  perform control for specifying, for the other unchanged one of the assist information and the adjustment information, the information set including the changed one of the assist information and the adjustment information, based on the information set stored in the memory, and storing information corresponding to the unchanged other one of the assist information and the adjustment information included in the specified information set as unchanged information in the new information set.

6. The image forming apparatus according to claim 1, wherein the processor is configured to:
  perform control for forming a predetermined checking image in accordance with the paper information; the assist information, and the adjustment information that are associated with one another;
  after performing the control for forming the checking image, receive appropriateness information indicating whether or not to store the paper information, the assist information, and the adjustment information that are associated with one another; and
  based on the received appropriateness information, perform control regarding whether or not the paper information, the assist information, and the adjustment information that are associated with one another are to be stored in the memory.

7. The image forming apparatus according to claim 2, wherein the processor is configured to:
  perform control for forming a predetermined checking image in accordance with the paper information, the assist information, and the adjustment information that are associated with one another;
  after performing the control for forming the checking image, receive appropriateness information indicating whether or not to store the paper information, the assist information, and the adjustment information that are associated with one another; and
  based on the received appropriateness information, perform control regarding whether or not the paper information, the assist information, and the adjustment information that are associated with one another are to be stored in the memory.

8. The image forming apparatus according to claim 3, wherein the processor is configured to:
  perform control for forming a predetermined checking image in accordance with the paper information, the assist information, and the adjustment information that are associated with one another;
  after performing the control for forming the checking image, receive appropriateness information indicating whether or not to store the paper information, the assist information, and the adjustment information that are associated with one another; and
  based on the received appropriateness information, perform control regarding whether or not the paper information, the assist information, and the adjustment information that are associated with one another are to be stored in the memory.

9. The image forming apparatus according to claim 4, wherein the processor is configured to:
  perform control for forming a predetermined checking image in accordance with the paper information, the assist information, and the adjustment information that are associated with one another;
  after performing the control for forming the checking image, receive appropriateness information indicating whether or not to store the paper information, the assist information, and the adjustment information that are associated with one another; and
  based on the received appropriateness information, perform control regarding whether or not the paper information, the assist information, and the adjustment information that are associated with one another are to be stored in the memory.

10. The image forming apparatus according to claim 5, wherein the processor is configured to:
  perform control for forming a predetermined checking image in accordance with the paper information, the assist information, and the adjustment information that are associated with one another;
  after performing the control for forming the checking image, receive appropriateness information indicating whether or not to store the paper information, the assist information, and the adjustment information that are associated with one another; and based on the received appropriateness information, performing control regarding whether or not the paper information, the assist information, and the adjustment information that are associated with one another are to be stored in the memory.

11. The image forming apparatus according to claim 1, further comprising a display,
wherein the processor is configured to perform control for displaying the paper information, the assist information, and the adjustment information on the display.

12. The image forming apparatus according to claim 2, further comprising a display,
wherein the processor is configured to perform control for displaying the paper information, the assist information, and the adjustment information on the display.

13. The image forming apparatus according to claim 3, further comprising a display,
wherein the processor is configured to perform control for displaying the paper information, the assist information, and the adjustment information on the display.

14. The image forming apparatus according to claim 4, further comprising a display,
wherein the processor is configured to perform control for displaying the paper information, the assist information, and the adjustment information on the display.

15. The image foil ling apparatus according to claim 5, further comprising a display,
wherein the processor is configured to perform control for displaying the paper information, the assist information, and the adjustment information on the display.

16. The image forming apparatus according to claim 6, further comprising a display,
wherein the processor is configured to perform control for displaying the paper information, the assist information, and the adjustment information on the display.

17. The image forming apparatus according to claim 7, further comprising a display,
wherein the processor is configured to perform control for displaying the paper information, the assist information, and the adjustment information on the display.

18. The image forming apparatus according to claim 8, further comprising a display,
wherein the processor is configured to perform control for displaying the paper information, the assist information, and the adjustment information on the display.

19. An image forming method comprising:
receiving paper information on a type of paper on which an image is formed;
acquiring assist information about assistance to supply the paper by supplying gas to the paper and adjustment information about positioning of the paper after assistance to supply the paper is performed, the assist information and the adjustment information corresponding to the received paper information and relating to transport of the paper;
determining whether the paper information, the assist information and the adjustment information are to be used as a parameter for image forming; and
in response that the paper information, the assist information, and the adjustment information are determined to be used as the parameter for image forming, performing control for storing the paper information, the assist information, and the adjustment information in association with one another into a memory.

20. A non-transitory computer readable medium storing a program causing a computer to execute a process for controlling an image forming apparatus, the process comprising:
receiving paper information on a type of paper on which an image is formed;
acquiring assist information about assistance to supply the paper by supplying gas to the paper and adjustment information about positioning of the paper after assistance to supply the paper is performed, the assist information and the adjustment information corresponding to the received paper information and relating to transport of the paper;
determining whether the paper information, the assist information and the adjustment information are to be used as a parameter for image forming; and
in response that the paper information, the assist information, and the adjustment information are determined to be used as the parameter for image forming, performing control for storing the paper information, the assist information, and the adjustment information in association with one another into a memory.

* * * * *